TELEPHONE EXCLUSION CIRCUIT
Filed Sept. 26, 1966
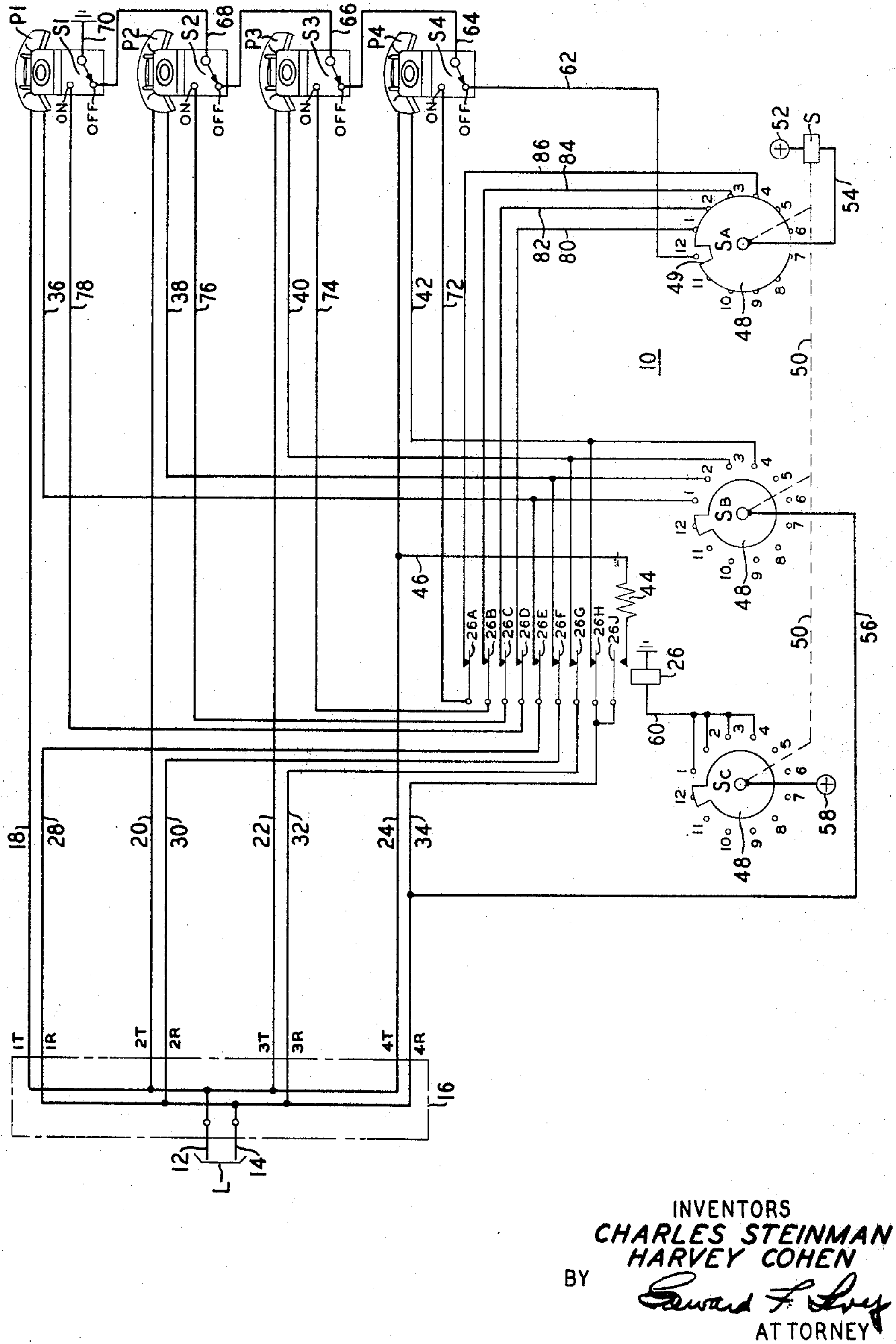
INVENTORS
CHARLES STEINMAN
HARVEY COHEN
BY Edward F. Levy
ATTORNEY United States Patent Office 3,504,128
Patented Mar. 31, 1970

3,504,128
TELEPHONE EXCLUSION CIRCUIT

Charles Steinman, 105 Stevens Ave. 10550, and Harvey Cohen, 211 Lorraine Ave. 10552, both of Mount Vernon, N.Y.

Filed Sept. 26, 1966, Ser. No. 582,028
Int. Cl. H04m 3/16
U.S. Cl. 179—17 10 Claims

ABSTRACT OF THE DISCLOSURE

A telephone exclusion circuit operative to exclusively connect a selected one of a plurality of extension telephones to a telephone line. Each extension telephone has a disabling switch serially connected in the lead connecting said extension telephone to the telephone line. The disabling switches are operative simultaneously in response to actuation of control means which is also operative to actuate the connect switch in parallel with the disabling switch in each extension line, so as to disconnect all of the extension telephones from the telephone line, except the selected telephone in use.

This invention relates generally to improvements in telephone communication systems having a plurality of extension telephones.

In conventional telephonic communication systems, extension telephones are usually adapted to be connected in parallel with each other and with a telephone line through appropriate switches located in the base of the respective telephones. That is, an extension telephone is connected with a telephone line simply by removing the receiver from the cradle so that the particular telephone goes "off-hook." The person using the telephone may then place his call and converse with the called partly in the conventional manner. Additionally, any one of the other extension telephones may also be connected with the same telephone line by the same procedure (i.e., by removing the receiver of any one of the other extension telephones from its associated cradle). In fact, this type of system has been used extensively for conference calls in which a plurality of people are connected with the called or calling party, as the case may be. However, this same system also provides a means for allowing unauthorized personnel to overhear private conversations. More specifically, someone desiring to eavesdrop on another party's conversation may do so by removing the receiver of any one of the unused extension telephones. Consequently, parties desiring complete telephonic privacy have been forced to use pay phones rather than risk the chance of being overheard, either accidently or otherwise, through an unused extension telephone.

Accordingly, an object of this invention is to provide a telephone exclusion circuit for a plurality of extension telephones which is operable to connect a selected one of the extension telephones to a telephone line and to exclude the other extension telephones therefrom. Hence, the possibility of any unauthorized personnel overhearing a conversation is eliminated.

Another object of the present invention is to provide a telephone exclusion circuit for a plurality of extension telephones in which the latter are adapted to be connected in parallel with each other and with a single telephone line when the circuit is not actuated so that any one of the extension telephones may be connected with the telephone line by placing the receiver off-hook.

A further object of the present invention is to provide a telephone exclusion circuit of the type described which is compatible for use with existing telephone systems having a plurality of extension telephones.

In furtherance of the above objects, the telephone exclusion circuit of the present invention comprises a plurality of sets of leads for connecting respective extension telephones to a conventional telephone line having tip and ring conductors. Serially connected in one lead of each set is a disabling means which is adapted to open circuit the lead when the disabling means is energized. Connected in parallel with each disabling means is a connect means which is adapted to shunt the open circuit caused by the associated disabling means with a closed circuit. Each connect means is adapted to be operated by a separate control means; each control means is associated with a different one of the extension telephones. Moreover, all the disabling means are adapted to be operated simultaneously with the operation of a single connect means so that the actuation of a control means causes the extension telephone associated with the actuated control means to be connected with the telephone line and the other extension telephones to be disconnected therefrom. Thus, it is rendered impossible for unauthorized persons to overhear any conversations by means of other extension telephones since they are not connected with the conversation-carrying telephone line. Additionally, the control means are selectively operable to restore the circuit to its original condition so that the plurality of extension telephones are adapted to be reconnected to the telephone line by removing the respective receivers from their associated cradles.

A feature of the present invention is to provide a telephone exclusion circuit for an extension telephone system which is selectively operable to provide a connection between a telephone line and all the extension telephones in the system or to provide a connection between a telephone line and only one extension telephone to the exclusion of the other extension telephones in the system.

Other features and advantages of the present invention will become more apparent from a consideration of the following detailed description when taken in conjunction with the accompanying drawing, in which the single figure is a schematic circuit wiring diagram, partially in diagrammatic form, of a telephone exclusion circuit constructed according to the present invention, illustrating its use in conjunction with a telephonic system having four extension telephones.

For purposes of illustration, the circuit of the present invention is described in conjunction with a telephone system having four extension telephones. However, it is to be noted that this is by way of illustration only and is not to be interpreted as a limitation of the present invention. That is, it will be apparent that the circuit of the present invention may be utilized with any number of extension telephones.

The telephone exclusion circuit of the present invention is designated generally by the numeral 10 in the drawing, and is adapted to be connected between a conventional telephone line L having a tip conductor 12 and a ring conductor 14 and four extension telephones respectively designated by the reference characters P1, P2, P3 and P4. For purposes of clarity, the respective sleeve conductors in the line L and the extension telephones P1–P4 are not shown because these conductors are connected to ground in the conventional manner. The tip conductor 12 is connected to the extension telephones P1–P4, through a terminal board 16, by respective telephone tip conductors or leads 18, 20, 22 and 24 in the conventional manner. On the other hand, the ring conductor 14 is adapted to be connected to the extension telephones P1–P4 through respective normally-closed contacts of a relay 26.

More specifically, the ring conductor 14 is connected to respective leads 28, 30, 32 and 34 through the terminal board 16. The leads 28–34 are connected to one side of normally-closed contacts 26E–26H, respectively, of the relay 26. The other side of the normally closed contacts 26E–26H of the relay 26 are connected to the extension telephones P1–P4 by respective telephone ring conductors or leads 36, 38, 40 and 42. Thus, when the relay 26 is deenergized the leads 28–34 will be connected with the leads 36–42, respectively, through the closed contacts of the relay 26 thereby to connect the telephones P1–P4 in parallel with each other and with the line L. However, when the relay 26 is energized the contacts 26E–26H will be opened thereby to break the connection between the leads 28–34 and the leads 36–42, respectively, to disconnect the telephones P1–P4 from the line L. In other words, an open circuit will exist between the telephone ring conductors 36–42 and the telephone line L ring conductor 14.

Connected in parallel with the normally closed contact 26H of the relay 26 is a normally open contact 26J. That is, one end of the contact 26J is connected to the lead 34. The other end of the contact 26J is connected to the ring conductor or lead 24, through a resistor 44, by a lead 46. The resistor 44 is provided to maintain a load on the line L during switching operations, as described in detail hereinbelow.

The arrangement 10 further includes a stepping switch which comprises an actuating solenoid S and three wafer decks respectively designated by the reference characters SA, SB and SC. The wafer decks SA, SB and SC each comprise a respective rotating contact 48 and a plurality of fixed or stationary terminals respectively numbered 1 through 12. The rotating contacts 48 of the wafer decks SA–SC are fixedly mounted on a common shaft, which is indicated diagrammatically by the dashed line 50, the rotation of which is controlled by the solenoid S. As is conventional in the operation of switches of this type, when the solenoid S is energized it causes the shaft 50 to rotate in the clockwise direction, as taken in the drawing, so that each rotating contact 48 is advanced one terminal. Additionally, the solenoid S will cause the shaft 50 to continue rotating so that the contacts 48 keep advancing in increments of one terminal on the associated wafer decks until the solenoid S is deenergized.

A source of potential 52 is connected to one end of the winding of the solenoid S. The other end of the winding of the solenoid S is connected to the moving contact 48 of the wafer deck SA by a lead 54. It is to be understood that the other terminal of the source of potential 52 and one terminal of all other sources of potential mentioned hereinbelow is connected to ground. The rotating contact 48 of the wafer deck SA is sized so that the contact 48 engages eleven of the twelve terminals associated with the wafer deck SA. That is, the contact 48 of the wafer deck SA is provided with a slot 49. When the slot 49 opposes a terminal on the wafer deck SA, that terminal will not be connected with the lead 54. Thus, at any one time, the lead 54 will be connected with eleven terminals of the wafer deck SA. For the position of the switch shown in the drawing, the lead 54 is connected with terminals 1–11 of the wafer deck SA while an open circuit exists between the lead 54 and the terminal 12.

The lead 34, and therefore, the ring conductor 14 of the telephone line L, is connected to the rotating contact 48 of the wafer deck SB by a lead 56. The contact 48 of wafer deck SB is adapted to engage only one of the terminals 1–12 of this wafer deck at any one time. Moreover, the contact 48 of the wafer deck SB is a break-before-make switch. That is, the contact 48 is adapted to be disconnected from one terminal before it engages the next succeeding terminal.

Connected to the rotating contact 48 of the wafer deck SC is a source of potential 58. The contact 48 of the wafer deck SC, similarly to the contact 48 of the wafer deck SB, is adapted to engage only one terminal at a time. However, the rotating contact 48 of the wafer deck SC is to be distinguished from the rotating contact 48 of the wafer deck SB because the contact 48 of the wafer deck SC is a make-before-break switch. That is, the rotating contact 48 of the wafer deck SC is adapted to engage the next succeeding terminal before it disengages from the previous terminal.

As noted hereinabove, the telephone exclusion circuit 10 of the present invention is illustrated in conjunction with four extension telephones only. Accordingly, with the exception of the wafer deck SA only, the first four terminals of the wafer decks are shown connected in the circuit. However, if more than four extension telephones are used, the other terminals of the wafer deck would be connected in a manner similar to the connection of the terminals 1–4 of each wafer deck. Moreover, if more than twelve extension telephones are used, wafer decks having an appropriate number of terminals to accommodate the additional plurality of extension telephones would be used.

The terminals 1–4 of the wafer deck SC are connected together and to one end of the winding of the relay 26 by a lead 60. The other end of the winding of the relay 60 is connected to ground. Accordingly, when the rotating contact 48 of the wafer deck SC engages any one of the contacts 1–4 of this wafer deck, the source of potential 58 will be connected across the winding of the relay 26 thereby to energize the relay. As noted in greater detail below, the relay 26 is a slow-to-operate quick release type relay which incorporates approximately a one second delay before the relay operates after it has been energized.

The terminals 1–4 of the wafer deck SB are respectively connected to the ring conductors or leads 36–42 of the respective telephones P1–P4. When the rotating contact 48 of the wafer deck SB engages terminal 1, for example, the ring conductor 14 of the line L will be connected to the telephone P1 through the circuit comprising the leads 34 and 56, wafer deck SB and the ring conductor 36. If the rotating contact 48 of the wafer deck SB had engaged any one of the other terminals 2, 3 or 4, then one of the extension telephones P2, P3 or P4, respectively, would be connected with the ring conductor 14 of the line L. It will now be apparent that the wafer deck SB is essentially connected in parallel with the contacts 26E–26H of the relay 26. Thus, albeit the extension telephones P1–P4 are disabled when the relay 26 is energized, one of the extension telephones may be connected with the tip and ring conductors 12 and 14 comprising the line L through the wafer switch SB.

Located at each one of the extension telephones P1–P4 is a respective single-pole double-throw switch respectively designated by the reference characters S1, S2, S3 and S4. The two terminals of the switches S1–S4 are respectively designated ON and OFF for reasons which will become apparent from a consideration of the description of the operation of the present invention as set forth hereinbelow. Under normal conditions, when all of the extension telephones P1–P4 are adapted to be connected with the line L, the armatures of the switches S1–S4 are connected with the OFF terminals of the associated switch.

The OFF terminal of switch S4 is connected to the terminal 12 of the wafer deck SA by a lead 62. The armature of the switch S4 is connected to the OFF terminal of the switch S3 by a lead 64. Similarly, the armature of the switch S3 is connected to the OFF terminal of the switch S2 by a lead 66. In a like manner, the armature of the switch S2 is connected to the OFF terminal of the switch S1 by a lead 68. The armature of the switch S1 is connected to ground by a lead 70. Hence, under normal conditions, the switches S1–S4 are connected in series and provide a path between the lead 62 and ground.

The ON terminals of each of the switches S4–S1 are respectively connected to one end of normally closed contacts 26A–26D of the relay 26 by respective leads 72, 74, 76 and 78. The other end of the contacts 26D–26A are respectively connected to the terminals 1 through 4 of the wafer deck SA by respective leads 80, 82, 84 and 86. The wafer deck SA is adapted to control the operation of the solenoid S to effect operation of the stepping switch in the manner noted below.

In order to facilitate an understanding of the operation of the present invention, it will be assumed that the elements comprising the telephone exclusion circuit 10 are in the position shown in the diagram. Thus, the extension telephones P1–P4 are adapted to be connected with the tip conductor 12 of the line L through the respective telephone tip conductors 18–24. Additionally, the telephone ring conductors 36–42 are connected with the ring conductor 14 of the telephone line L through the respective closed contacts 26E–26H of the relay 26 and the respective leads 28–34. Accordingly, when any one of the extension telephones P1–P4 goes off-hook, the party using the particular telephone will be connected with the line L in the conventional manner and will be able to place calls simply by dialing the party desired. Additionally, each one of the extension telephones P1–P4 will be able to receive calls in the conventional manner.

As is conventional in telephone systems of the type under consideration, the AC current produced by the voice of the parties to a telephone conversation is carried by the tip and ring conductors. The ringing current which actuates the bell in the telephone is carried by the ring and sleeve conductors. Accordingly, it is to be noted that the relay contacts 26E–26H are serially connected between the ring conductor 14 of the line L and the respective ring conductors 36–42 of the extension telepones P1–P4. Hence, when the telephone exclusion circuit 10 is actuated, the ring conductors 36–42 essentially will be open circuited so that those telephones not connected to the ring conductor 14 of the line L will not receive ringing current. On the other hand, if the contacts of the relay 26 were serially connected in the respective tip conductors of the telephones P1–P4, it would still be possible for the telephones to receive ringing current through the ring and sleeve conductors of the respective extension telephones, even though the telephone exclusion circuit 10 has been actuated.

In operation, when a party desires to have his extension exclusively connected with the line L he operates the single-pole double-throw switch associated with his extension telephone. For example, assuming that a party wishes to have the telephone P3 connected with the line L and the other extension telephones P1, P2 and P4 disconnected therefrom, the armature of the switch S3 is connected to the ON terminal of the switch. Accordingly, the stepping switch is actuated through the circuit comprising the source of potential 52, the winding of the solenoid S, the lead 54, the rotating contact 48 of the wafer deck SA, terminal 3 of the wafer deck SA, the lead 84, the normally closed contacts 26B of the relay 26, the lead 74, switch S3, the serially connected switches S2 and S1, and the lead 70 to ground. The shaft 50 of the stepping switch thereupon begins to rotate under control of the solenoid S thereby stepping the rotating contacts 48 of the respective wafer decks SA, SB and SC until the energizing circuit to the solenoid S is broken thereby deenergizing the solenoid winding. Thus, the shaft 50 rotates until the rotating contact 48 of the wafer deck SA is disengaged from terminal 3 (i.e., until the slot 49 is opposite terminal 3) thereby breaking the connection between the source of potential 52 and ground. At this point the stepping switch will have stepped through three termnals so that the rotating contacts 48 of the wafer decks SB and SC will be engaged with the respective terminals 3.

When the rotating contact 48 of the wafer deck SC engages terminal 1 thereof, the winding of the relay 26 is energized through the circuit comprising the source 58, wafer deck SC, the lead 60, and the winding of the relay 26 to ground. Approximately one second after the relay 26 has been energized, the contacts 26A–26H of the relay 26 will open and the contacts 26J will close. Accordingly, the ring conductors 36–42 of the respective extension telephones P1–P4 will be disconnected from the ring conductor 14 of the line L, thereby to prevent the operation of the telephones. To put this another way, the ring conductors of the respective extension telephones will be open circuited. On the other hand, the resistor 44 will be connected across the tip and ring conductors 12 and 14 of the line L through the circuit comprising leads 34, 46 and 24, and the contacts 26J of the relay 26. The resistor 44 is chosen to have the same impedance as the line so that the line L is terminated in its characteristic impedance during the switching operations.

The winding of the relay 26 remains energized as the rotating contact 48 of the wafer deck SC is sequentially engaged with contacts 2 and 3 because all of these contacts are connected together by the lead 60. It is also to be noted that the winding of the relay 26 remains energized as the rotating contact 48 of the wafer deck SC moves from one terminal to the next terminal because the contact 48 always engages the next succeeding terminal before it has been disengaged from the previous terminal. Hence, a complete circuit will always exist from the source of potential 58, through the winding of the relay 26 to ground as the contact 48 of the wafer deck SC is stepped through the terminals 1–4.

Simultaneously with the rotation of the contacts 48 of the wafer decks SA and SC, the rotating contact 48 of the wafer deck SB is sequentially stepped through the terminals 1 and 2 until the contact engages the terminal 3 of this wafer deck. Thus, the ring conductor 40, which is connected to the telephone P3, will be connected to the ring conductor 14 of the line L through terminal 3 and the rotating contact 48 of the wafer deck SB and the leads 58 and 34. In effect, the wafer deck SB shunts the open circuit in the ring conductor 40 due to the open contacts 26G with a closed circuit loop. Hence, the person using the extension telephone P3 will be able to send and receive telephone calls in the conventional manner. However, since the ring conductors 36, 38 and 42 of the respective telephones Pl, P2 and P4 are not connected to the ring conductor 14 of the line L, these telephones essentially will be disabled. That is any person using the telephones P1, P2 or P4 will not be able to send or receive telephone calls. Consequently, the person using the telephone P3 may do so without any fear of his conversation being overheard via any one of the other extension telephones.

As noted hereinabove, the relay 26 incorporates a time delay so that the contacts 26A–26H remain closed and the contacts 26J remain open for at least one second after the relay 26 has been energized. This delay is incorporated into the relay to permit the aforementioned shunt circuit to be established prior to the time the ring conductors ore open circuited. Thus, at least one of the telephones P1-P4 will be connected with the ring conductor 14 through the wafer deck SB before the contacts 26E-26H open.

In order to prevent the disconnected extension telephones from being reconnected with the telephone line L during the interval of time that the extension telephone P3 is connected with the line L, the switches S1, S2 and S4 are rendered inoperative after the armature of the switch S3 has been connected to the ON terminal. That is, when the relay 26 is engaged the contacts 26A–26D will open thereby breaking the conection between the wafer deck SA and the ON terminals of each of the switches S1–S4. Thus, even though the armature of one of the switches, such as S2, is moved to the ON terminal, the solenoid S will not be energized because of the open circuit which exists between the source 52 and ground due to the fact that the contacts 36C of the relay 26 is open. Accordingly, only that one of the switches S1–S4 which has been the first to be operated can control the operation of the telepone exclusion circuit 10.

When the telephone call has been completed the party may return the telephone exclusion circuit to its normal condition in which all of the extension telephones P1–P4 are again adapted to be connected with the line L simply by returning the armature of the switch S3 to the OFF terminal. The stepping switch is again actuated through the circuit comprising the source 52, the solenoid winding S, lead 54, the rotating contact 48 of the wafer deck SA, terminal 12 thereof (which is now in engagement with the rotating contact 48), the lead 62, the serially connected switches S1–S4, and through the lead 70 to ground. Accordingly, the shaft 50 will rotate to sequentially step the rotating contacts 48 until the rotating contact 48 of the wafer deck SA again is disengaged from the terminal 12 thereby breaking the aforementioned circuit to deenergize the solenoid winding S.

When the relay 26 releases the contacts 26A–26J, the extension telephones P1–P4 again will be adapted to be connected with the line L and the switches S1–S4 will be reconnected so that the operation of any one of the switches will connect the associated extension telephone to the telephone line L to the exclusion of the other extension telephones.

Accordingly, a circuit has been provided for an extension telephone system to selectively connect all of the extension telephones with a single telephone line or to connect only one of the extension telephones with the single telephone line to the exclusion of the remainder of the extension telephones thereby to prevent overhearing of a confidential conversation via the remaining extension telephones.

While a preferred embodiment of the invention has been shown and described herein it will become obvious that numerous omissions, changes, and additions may be made in such embodiment without departing from the spirit and scope of the present invention.

What is claimed is:

1. A circuit for controlling the connection of a plurality of extension telephones with a telephone line having at least a tip and a ring conductor said circuit comprising a set of lead means for each extension telephone for connecting respective ones of the extension telephones with the telephone line, a disconnect means serially connected in at least one lead means of each of said sets of lead means and each disconnect means being operable to open circuit said one lead means to disconnect the respective extension telephones from the telephone line, connect means connected in parallel with each of said disconnect means and being individually and selectively operable to close the open circuit caused by at least a predetermined one of said disconnect means, and control means associated with each of the extension telephones and each being operable from a first to a second state for operating each of said disconnect means and a preselected one of said connect means, whereby the extension telephone associated with said operated control means is connected with the telephone line through said preselected connect means and the other of the plurality of extension telephones are disconnected from the telephone line by the operated disconnect means.

2. A circuit as in claim 1, in which said control means includes means for preventing operation of each of the other said control means after one of said control means has been operated to the second state.

3. A circuit according to claim 2, in which said control means are operable to disable and disconnect and connect means when the operated control means is restored to the first state.

4. A circuit as in claim 1, in which said control means includes a stepping switch having a first wafer deck provided with a plurality of stationary terminals, a winding and a rotating contact adapted to engage said plurality of terminals; an energizing source for said stepping switch; and means for serially connecting together said energizing source, said winding and said rotating contact; a switch at each of the extension telephones operable from a first to a second state; means for connecting respective ones of said plurality of terminals of said wafer deck with different ones of said switches, and means for connecting said switches with said energizing source so that the operation of any one of said switches to said second state connects said energizing source across said winding to actuate said stepping switch through said wafer deck, whereby said winding remains energized until said rotating contact is disengaged from the terminal connected with the switch operated to said second state.

5. A circuit as in claim 1, in which said disconnect means comprises a relay having a plurality of normally closed contacts, respective ones of said normally closed contacts being serially connected in one lead means of each of said sets of lead means, whereby said contacts are adapted to be opened when said relay is energized thereby to open circuit said one of said lead means in each of said sets of lead means to break the circuit between each of the extension telephones and the telephone line.

6. A circuit as in claim 5, and a resistor having one end connected to one of said lead means and the other end connected to another of said lead means through a normally open contact of said relay, said resistor being adapted to be connected across the telephone line when the relay is energized, whereby the telephone line is terminated in an impedance during the operation of said control means.

7. A telephone communication system including a telephone line having at least tip and ring conductors and a plurality of extension telephones each having at least a tip and ring conductor, first means for connecting together said telephone line tip conductor and all of said extension telephone tip conductors, second means operative to be rendered into a first state in which said second means connects said extension telephone ring conductors with said telephone line ring conductor said second means being also operative to be rendered alternately into a second state wherein said second means disconnects said extension telephone ring conductors from said telephone line ring conductor, connect means connected between said extension telephone ring conductors and said telephone line ring conductor and being operable to connect said telephone line ring conductor with at least preselected ones of said extension telephone ring conductors, and control means operatively connected with said second means and said connect means for operating said second means to the second state and for operating said connect means to connect said preselected ones of said extension telephone ring conductors with said telephone line ring conductor, a switch at each of said plurality of extension telephones for actuating said control means in response to the change of state of said switch from a first state to a second state, whereby said connect means is operated to connect at least the ring conductor of the extension telephone associated with that switch in the second state to said telephone line ring conductor.

8. A telephone communication system as in claim 7, and lead means for connecting said connect means in parallel with said second means, whereby said connect means provides a shunt path for ringing current.

9. A telephone communication system as in claim 7, in which said connect means includes a switch having a plurality of fixed terminals and a rotating contact adapted to individually engage each of said plurality of fixed terminals, a different fixed terminal being connected with respective ring conductors of said plurality of extension telephones, said telephone line ring conductor being connected with said rotating contact, said control means being operatively connected with said rotating contact to rotate said contact to sequentially engage said plurality of fixed terminals, whereby the engagement of said rotating contact with a predetermined fixed terminal establishes a connection between said telephone line ring conductor and the extension telephone ring conductor connected to said predetermined fixed terminal.

10. A telephone communication system as in claim 7, in which said control means includes a stepping switch comprising a rotatable shaft, a solenoid for rotating said shaft in discrete steps; a wafer deck having a plurality of fixed terminals and a rotating contact connected to said shaft and being adapted to engage all but one of said plurality of terminals; a two terminal energizing source for energizing said solenoid winding; means for connecting one terminal of said energizing source with said rotating contact, means for connecting a different terminal of said plurality of fixed terminals with respective ones of said switches, and means for connecting said switches with the other terminal of said energizing source so that the operation of a switch to the second state completes the circuit between said energizing source and said solenoid winding to cause rotation of said rotating contact, whereby said rotating contact is continuously sequentially disengaged from the terminal connected with said switch in the second state to break said circuit and deenergize said solenoid winding.

References Cited

UNITED STATES PATENTS

| | | | |
|---|---|---|---|
| 2,035,594 | 3/1936 | Crocker | 179—17 |

KATHLEEN H. CLAFFY, Primary Examiner

J. S. BLACK, Assistant Examiner

U.S. Cl. X.R.

179—30